United States Patent [19]

Gaines

[11] Patent Number: 4,890,876

[45] Date of Patent: Jan. 2, 1990

[54] PORTABLE ROADSTER COVER

[76] Inventor: Van G. Gaines, Rte. 5, Box 522, Magnolia, Ark. 71753

[21] Appl. No.: 293,352

[22] Filed: Jan. 4, 1989

[51] Int. Cl.$^4$ ................................................ B60J 7/20
[52] U.S. Cl. .................................. 296/136; 296/180.1; 296/24.1
[58] Field of Search ............................. 296/136, 180.1

[56] References Cited

U.S. PATENT DOCUMENTS

| | | | |
|---|---|---|---|
| 3,154,341 | 10/1964 | Booth | 296/136 |
| 4,600,233 | 7/1986 | Boyston | 296/136 |
| 4,687,247 | 8/1987 | Muscat | 296/136 |
| 4,761,030 | 8/1988 | Boykin | 296/180.1 |
| 4,767,147 | 8/1988 | Kobayakawa | 296/180.1 |

Primary Examiner—Robert R. Song
Attorney, Agent, or Firm—Fleit, Jacobson, Cohn, Price, Holman & Stern

[57] ABSTRACT

A foldingly collapsible upstanding transverse wall or partition assembly is provided for mounting within the interior of a convertible-type vehicle having front and rear seats as well as a cover assembly for removably securement over the rear portion of the interior of the vehicle and wherein the cover assembly includes a forward margin supported from the upper margin of the wall or partition assembly, opposite side margins supported from the upper surfaces of the side walls of the vehicle and a rear margin supported from a transverse upwardly facing surface of the vehicle disposed immediately rearward of the rear seats thereof. The cover assembly includes front-to-rear extending upward projections whose forward extremities define upstanding surfaces disposed immediately behind the driver and passenger head positions of a driver and passenger disposed in the front seat of the vehicle and the cover assembly and its projections serve to smooth out the air flow over the vehicle rearward of the front seat to prevent strong air eddy currents and wind noise when the vehicle is traveling at highway speeds.

15 Claims, 6 Drawing Sheets

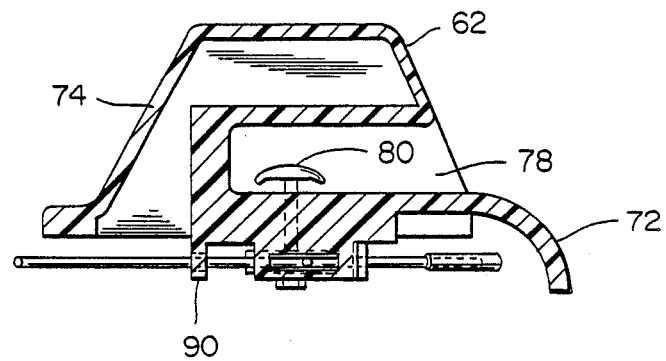
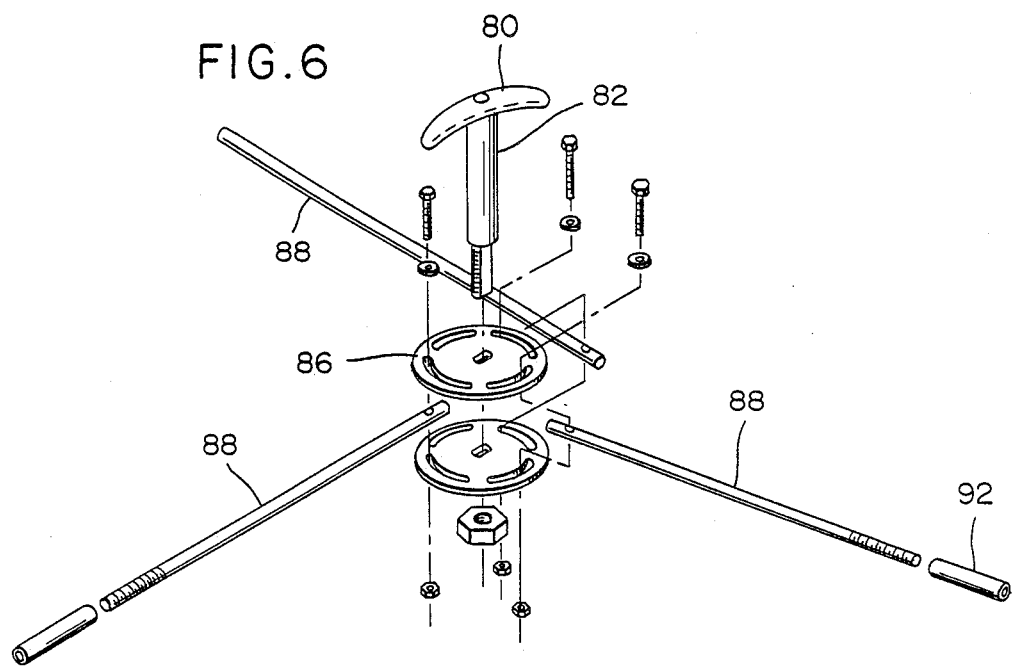
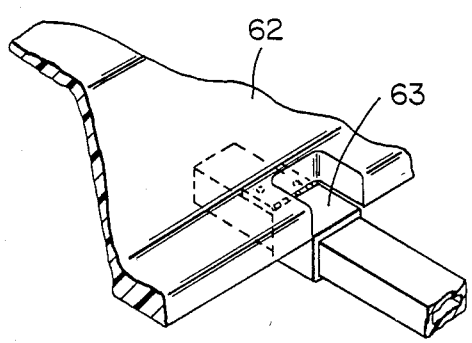
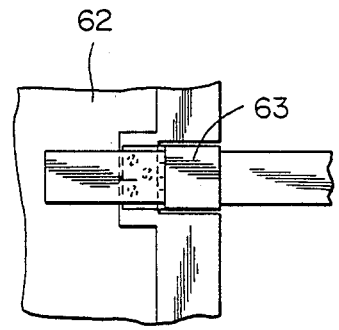

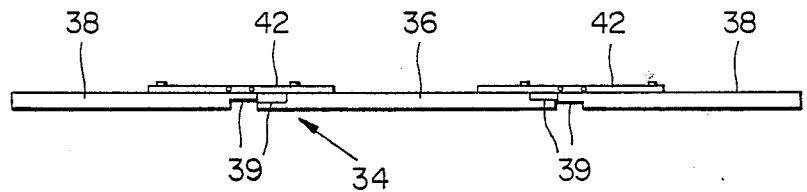
FIG. 14
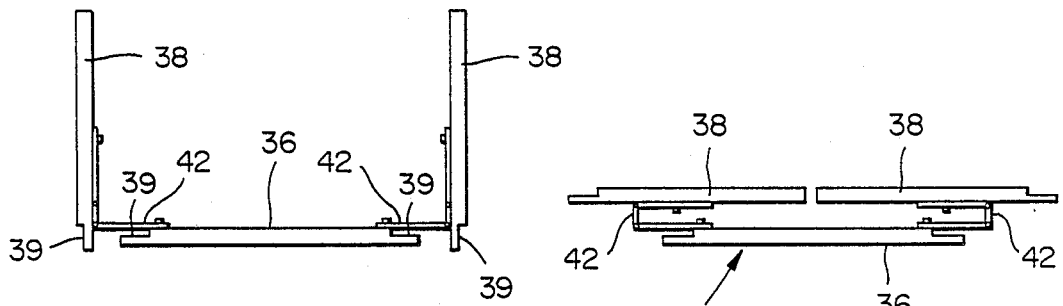
FIG. 14a
FIG. 14b
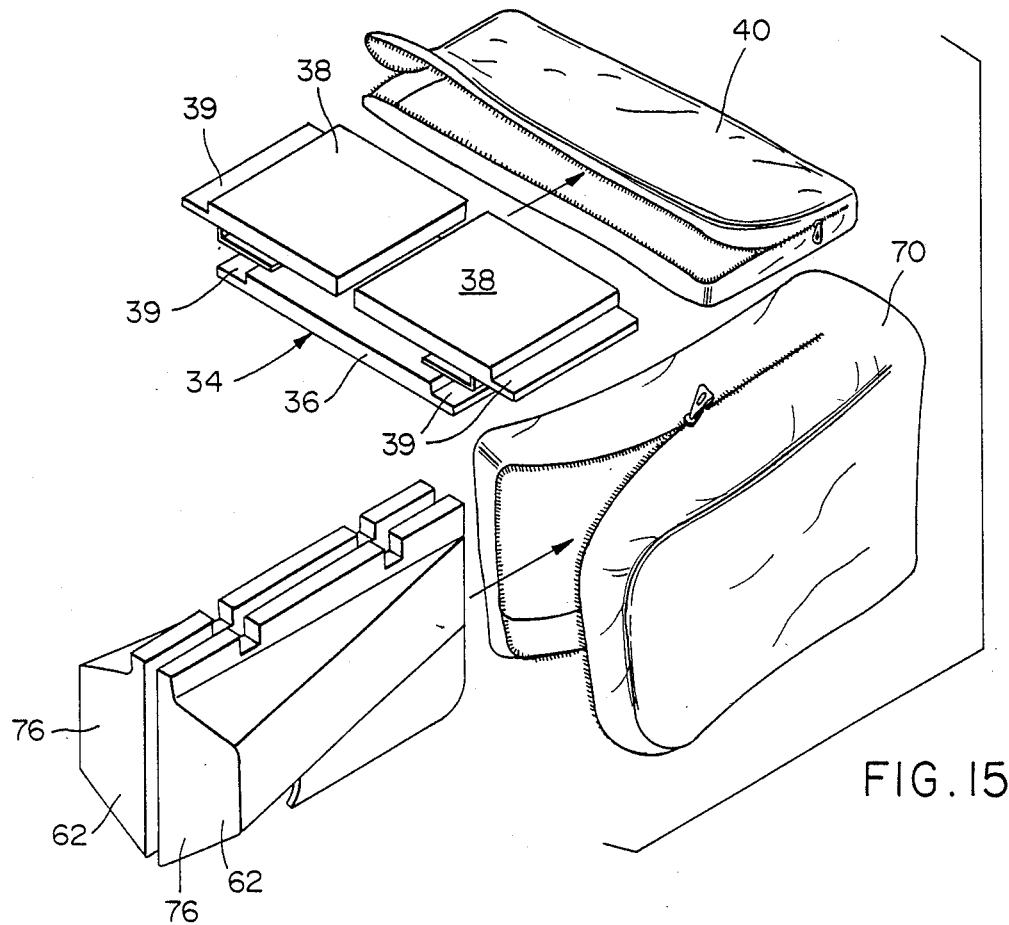
FIG. 15

PORTABLE ROADSTER COVER

BACKGROUND OF THE INVENTION

Field Of The Invention

This invention, in its most comprehensive form, resides in the provision of a foldingly collapsible upstanding partition for removable securement within a convertible-type automobile immediately rearward of the front seat structure of the automobile and with the upper margin of the partition generally horizontally registered with the upper margins of the side walls of the vehicle and the transverse upwardly facing surface of the vehicle disposed immediately rearward of the rear seat structure of the vehicle. The partition is releasably supported from the side walls of the vehicle and a cover or top is provided which also is foldably collapsible and removably secured over that portion of the interior of the vehicle disposed rearward of the partition, the cover including downwardly facing surfaces closely juxtaposing the upper margin of the partition, the upper margins of the side walls of the vehicle and the upwardly facing transverse surface of the vehicle disposed to the rear of the rear seat structure, latch structure being provided for releasably and lockably latching the cover in position closing the interior portion of the vehicle disposed therebeneath. Further, the forward portion of the cover includes upwardly projecting portions for disposition immediately behind the heads of a driver and passenger seated upon the front seat structure, the cover upwardly projecting portions serving to shield the heads of the driver and passenger from swirling air currents and comprising forward extremities of rearwardly tapering upward projections of the cover extending in front-to-rear directions therealong.

INFORMATION DISCLOSURE STATEMENT

Various different forms of covers including some of the general structural and operational features of the instant invention are disclosed in U.S. Pat. Nos. 3,338,617, 3,446,526, 3,861,735, 3,923,334, 3,954,296 and 4,133,573. However, these various different forms of previously known covers do not include the overall structural and operational features of the instant invention.

SUMMARY OF THE INVENTION

Many persons who own convertibles having front and rear seats drive their vehicles in warm weather with the tops of the vehicles down. In slow and moderate speed driving situations the existence of an open passenger area rearward of the front seats of a convertible does not cause excessive eddy air currents about the driver of a convertible. However, at higher highway speeds the presence of a large upwardly opening passenger receiving area rearward of the front seat of a convertible causes relatively strong air eddy currents to be formed about the head of the driver of a vehicle and a passenger who may be also seated in the front seat. These strong eddy air currents make conversation between the driver and the passenger difficult and also make it difficult for persons in the front seat of a convertible to hear music or news broadcasts over the vehicle radio without the volume control of the radio being set excessively high. Of course, at any time vehicle speed is slowed from highway speeds the radio is too loud and the volume control thereof must be reset to a lower volume and, conversely, as highway speed is once again achieved the radio volume control must be set higher.

In addition, the above referred to strong air eddy currents can excessively chill the driver and front seat passenger of a convertible during moderate temperature weather.

Accordingly, a need exists for structure whereby the strong air eddy currents usually experienced by the driver of a convertible having its top down and moving at highway speeds may be substantially reduced. To this end, a cover is provided for covering the entire rear portion of the interior of a vehicle disposed rearward of the front seat thereof. In addition, the cover includes elevated forward portions positioned to be in fore and aft alignment with the head of the driver of the vehicle and also the head of a passenger in the vehicle and the height and width of these forward portions is such that they, being disposed closely behind the head of the driver and the head of a passenger in the front seat, substantially reduce air eddy currents about the heads of the driver and passenger of a convertible vehicle when the vehicle has its top down and is travelling at highway speeds.

The main object of this invention is to provide a removable cover for the rear portion of the interior of a convertible immediately rearward of the front seat thereof.

Another object of this invention is to provide a cover shaped to substantially eliminate air eddy currents about the driver of a convertible and a passenger also disposed on the front seat of the convertible.

Yet another object of this invention is to provide a cover which also will enable security storage of items beneath the cover when the top of the associated convertible is down.

Another object of this invention is to provide an apparatus by which a conventional convertible vehicle equipped with both front and rear seats may be transformed into a roadster-type vehicle.

Still another object of this invention is to provide a cover which also may serve as a support for a headrest pad immediately rearward of the driver and front seat passenger of a vehicle.

A final object of this invention to be specifically enumerated herein is to provide a cover in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an enlarged transverse vertical sectional view taken substantially upon the plane indicated by the section line 5—5 of FIG. 4;

FIG. 6 is an enlarged exploded perspective view of the combined latching and lock structure for one of the cover halves;

FIG. 7 is an enlarged fragmentary perspective view illustrating a portion of the hinge structure by which the two cover halves are hingedly supported relative to each other;

FIG. 8 is a fragmentary bottom plan view of the structure illustrated in FIG. 7;

FIG. 14 is a top plan view of the partition wall structure with the hinges thereof in extended positions preparatory to relatively folding the partition sections;

FIG. 14a is a top plan view similar to FIG. 14 but with the partition wall sections in partially relatively folded positions;

FIG. 14b is a top plan view similar to FIG. 14a but with the partition wall sections in fully relatively folded positions; and FIG. 15 is a perspective view illustrating the folded partition wall structure preparatory to being received within a flexible cover and the cover sections folded relative to each other preparatory to being received within a cover therefor.

DESCRIPTION OF THE PREFERRED EMBODIMENT

Figure 1:
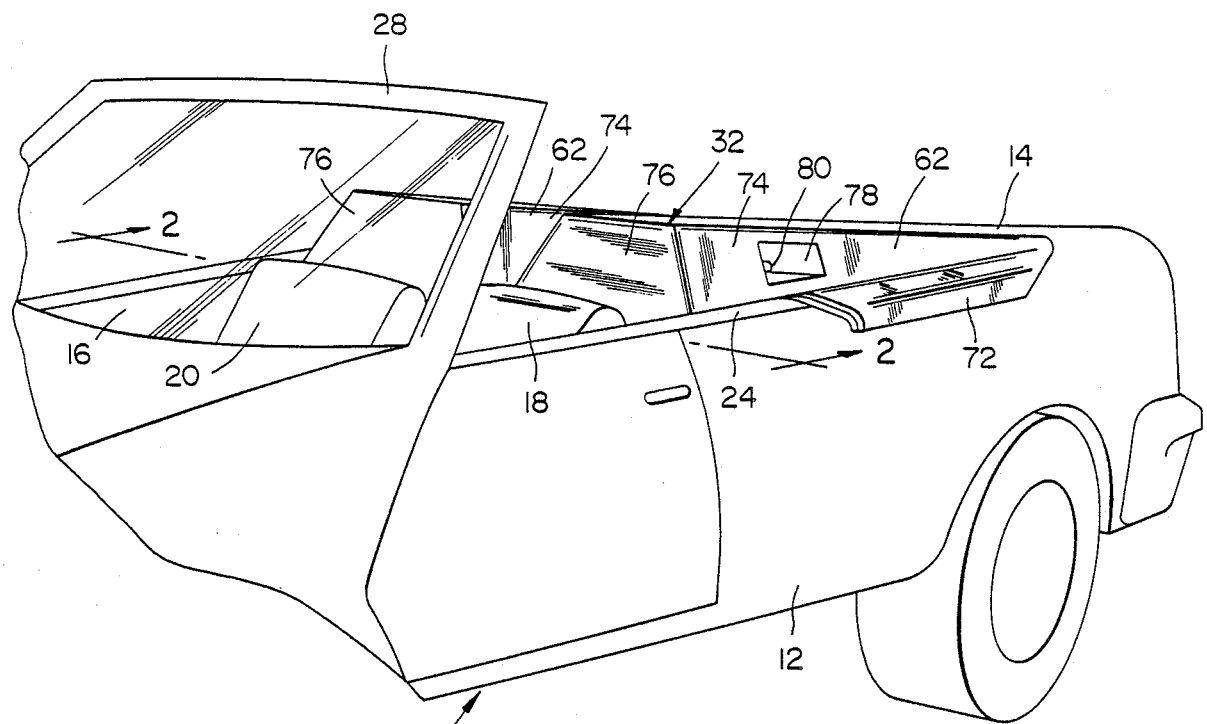
FIG. 1 is a fragmentary perspective view of a convertible with the cover of the instant invention operatively associated therewith.

Referring now more specifically to the drawings, the numeral 10 generally designates a conventional form of convertible automobile including front-to-rear extending opposite side body side wall portions 12 and a rear upwardly facing transverse surface portion 14 extending between rear portions of the body side wall portions 12.

Forward of the transverse surface portion 14 and between the body side wall portions 12 is defined a body interior portion 16 for receiving occupants of the vehicle 10 and the body interior portion 16 includes front seat structure incorporating a driver's seat 18 and a front passenger seat. The body interior portion 16 also includes a rear seat structure 22 spaced rearward of the front seat structure and forward of the transverse surface portion 14. The body side wall portions 12 include upper margins 24 generally horizontally aligned with the transverse surface portion 14 and the latter is disposed immediately forward of the rear trunk lid 26, if the vehicle 10 is so equipped. In addition, a front windshield assembly 28 is disposed forward of and projects upwardly from the forward extremity of the body interior portion 16.

When the vehicle 10 is being driven at slow city speeds and intermedite urban speeds with the top 30 of the vehicle 10 in the collapsed position, persons seated in the seats 18 and 20 are not subject to strong air eddy currents and wind-noise. However, when the convertible 10 is driven at higher speeds the entire body interior portion 16 as well as the area immediately above the interior body portion and rearward of the windshield assembly 28 experiences heavy air eddy currents and wind noise. These air eddy currents and wind noise are, of course, objectionable and the heavy air eddy currents have an excessive cooling effect upon persons seated in the seats 18 and 20, even when the ambient temperature is 75° F. or above.

Still further, when a convertible such as the vehicle 10 is unoccupied, any personal effects remaining within the body interior portion 16 are in full view and subject to theft.

In order to substantially eliminate the aforementioned strong air eddy currents and wind noise and to provide a closed body interior portion area in which personal items may be placed against theft when the vehicle 10 is unattended, a cover assembly referred to in general by the reference numeral 32 is provided and utilized in conjunction with a transverse partition assembly referred to in general by the reference numeral 34.

Figure 10:
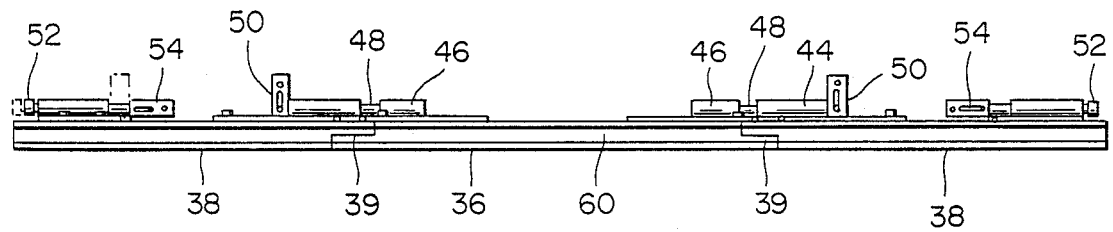
FIG. 10 is a top plan view of the partition wall structure.

The transverse partition assembly 34 incorporates a center section 36 and a pair of opposite side sections 38, the center section 36 may be provided with a notch 40 in the lower margin thereof for disposition over the drive shaft hump 42 in the body interior portion 16 and the opposite side sections 38 are hingedly supported from corresponding side margins of the center section 36 through the utilization of articulated hinge assemblies 42. The hinge assemblies 42 are each slidably mounted from the center section 36 and the corresponding opposite side section 38 and adjoining marginal edges of the center section 36 and the opposite side sections 38 are complimentarily rabbeted as at 39, see FIG. 10. In this manner, the transverse panel assembly 34 may have the panels 36 and 38 thereof disposed in coplanar edge abutting relation in the manner illustrated in FIGS. 10 and 14, or the panels 36 and 38 may be folded relative to each other in the manner illustrated in FIG. 14b and the folded transverse partition assembly 34 may be inserted and closed within a storage bag 40, see FIG. 15.

When the transverse panel assembly 34 is to be folded, the sections 38 are each shifted away from the corresponding marginal edge of the section 36 in the manner illustrated in FIG. 14. Then, the sections 38 are swung through the positions thereof illustrated in FIG. 14a to the fully folded positions thereof illustrated in FIG. 14b. Of course, when it is desired to again return the transverse partition assembly 34 to an operative condition, the immediately above referred to steps are reversed.

Figure 11:
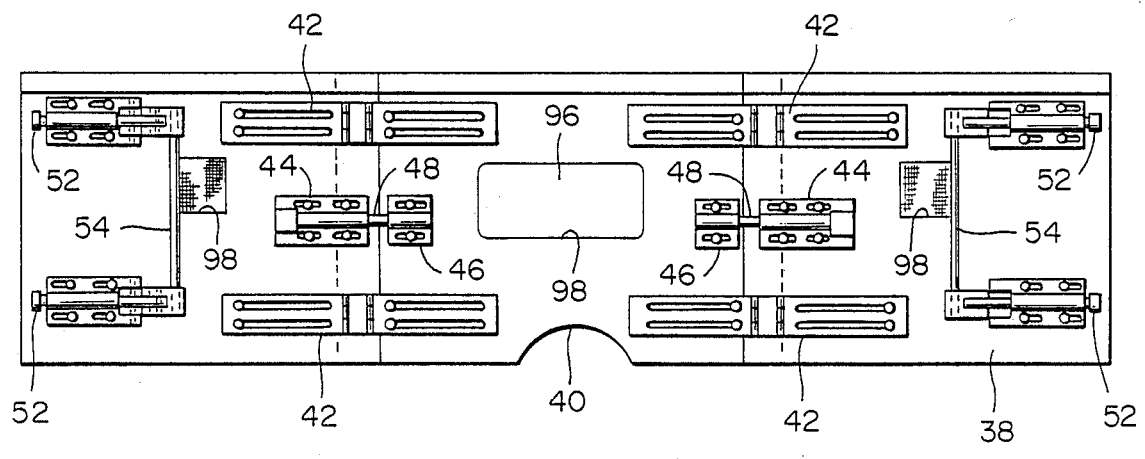
FIG. 11 is a rear elevational view of the partition wall structure.

The adjacent marginal edges of the panels 36 and 38 include coacting lock and keeper structures 44 and 46, see FIG. 11, and each of the lock structures 44 includes a lock pin 48 projectable into the corresponding keeper structure 46 and a releasable latch 50 for releasably retaining each lock pin 48 in an extended position.

Figure 12:
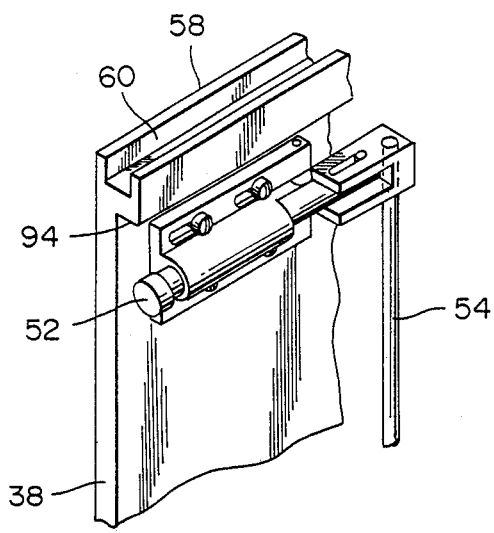
FIG. 12 is an enlarged fragmentary perspective view of the portion of the latch structure for the partition wall structure illustrated in the upper left hand portion of FIG. 11 and with the latch structure in a retracted position.
Figure 12A:
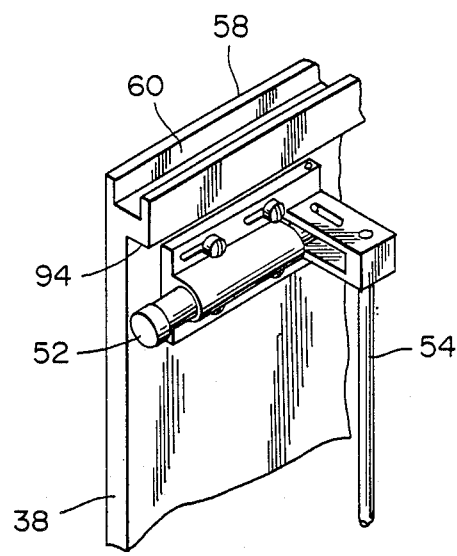
FIG. 12a is a fragmentary perspective view similar to FIG. 12 but with the latch structure in an extended operative position.
Figure 13:
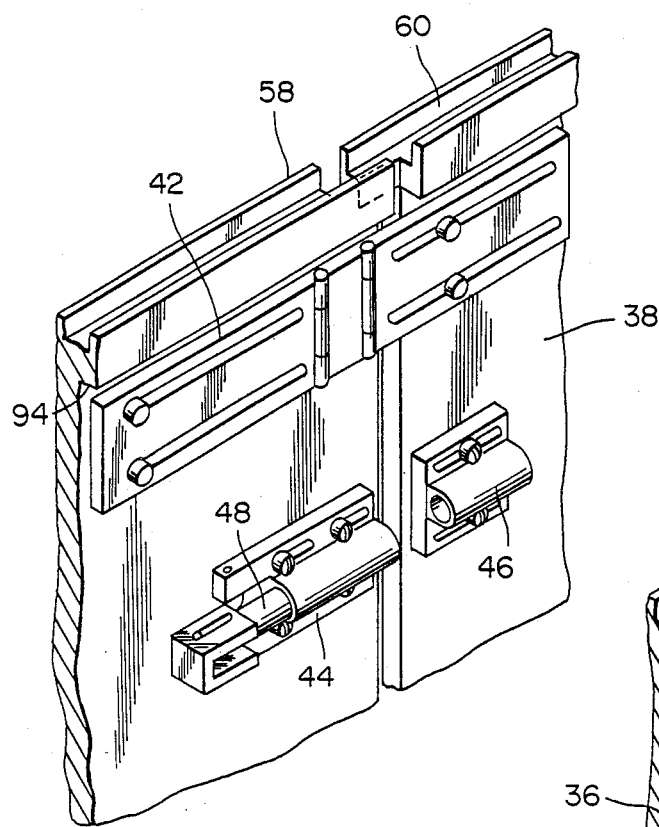
FIG. 13 is an enlarged fragmentary perspective view of one of the hinge structures for the partition wall structure and one of the releasable locks for preventing relative pivoting between adjacent partition wall structure sections, the lock being in a retracted position.
Figure 13A:
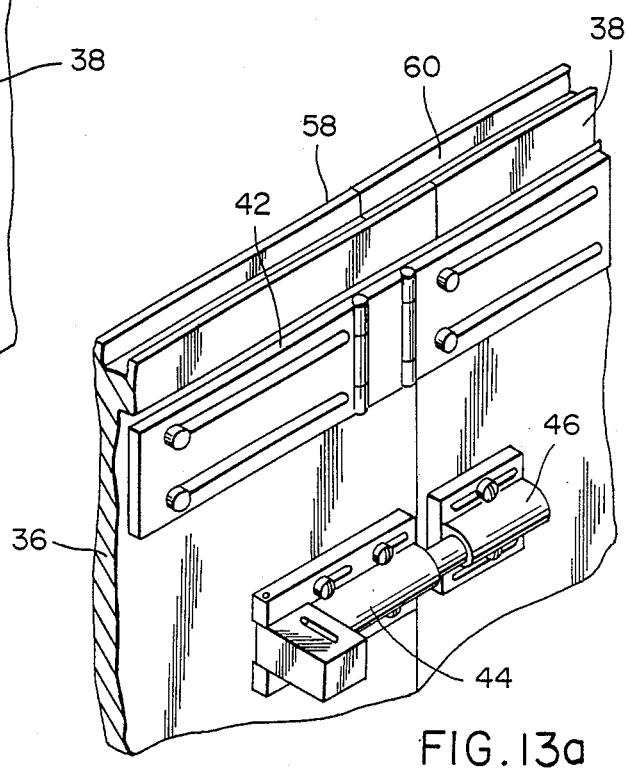
FIG. 13a is a fragmentary perspective view similar to FIG. 13 illustrating the lock in an extended operative position.

The remote marginal edges of the opposite side sections 38 include upper and lower extendable and retractable plungers 52 shiftably supported therefrom and each pair of upper and lower plungers is interconnected by a single operating lever 54. The plungers 52 are shiftable between the retracted and extended positions thereof illustrated in FIGS. 12 and 12a in response to swinging of the corresponding operating lever 54 through an arc of generally 90° and the plungers 52 and 54 may merely abut opposing inner surfaces of the body side wall portions 12 in tight frictional engagement therewith, or be received in slight recesses (not shown) provided therefor in the inner surfaces of the body side wall portions 12. In any event, the transverse partition assembly 34 may be mounted within the body interior portion 16 immediately behind the seats 18 and 20, the transverse partition assembly including an upper margin 58 at least generally horizontally aligned with the upper margins 24 and the transverse surface portion 14. Also, the upper margin 58 defines an upwardly opening channel 60 extending across the upper margin 58 of the transverse partition assembly 34.

Figure 2:
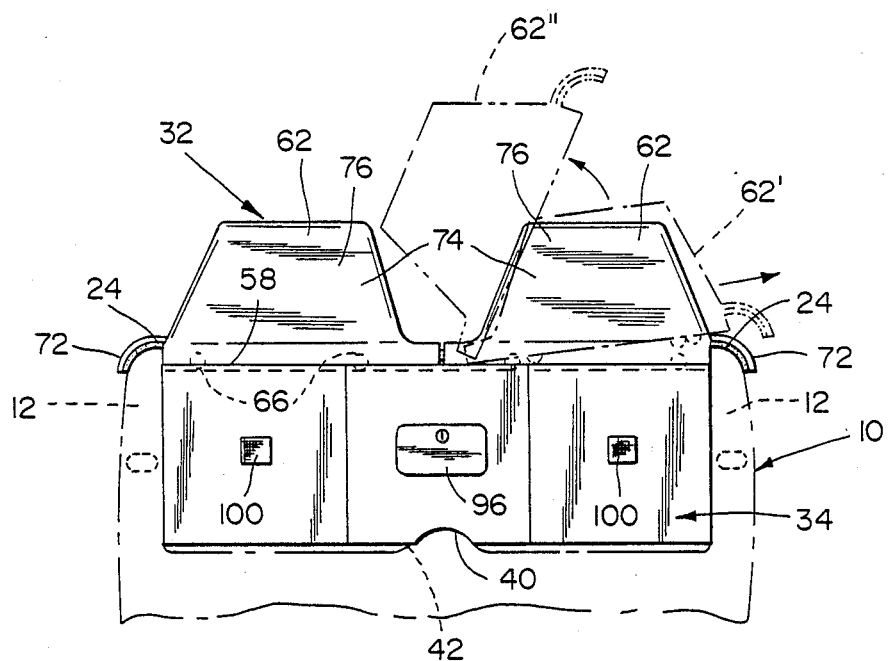
FIG. 2 is a transverse vertical sectional view taken substantially upon the plane indicated by the section line 2—2 of FIG. 1 and with the outline of the vehicle being fragmentarily illustrated in phantom lines.
Figure 3:
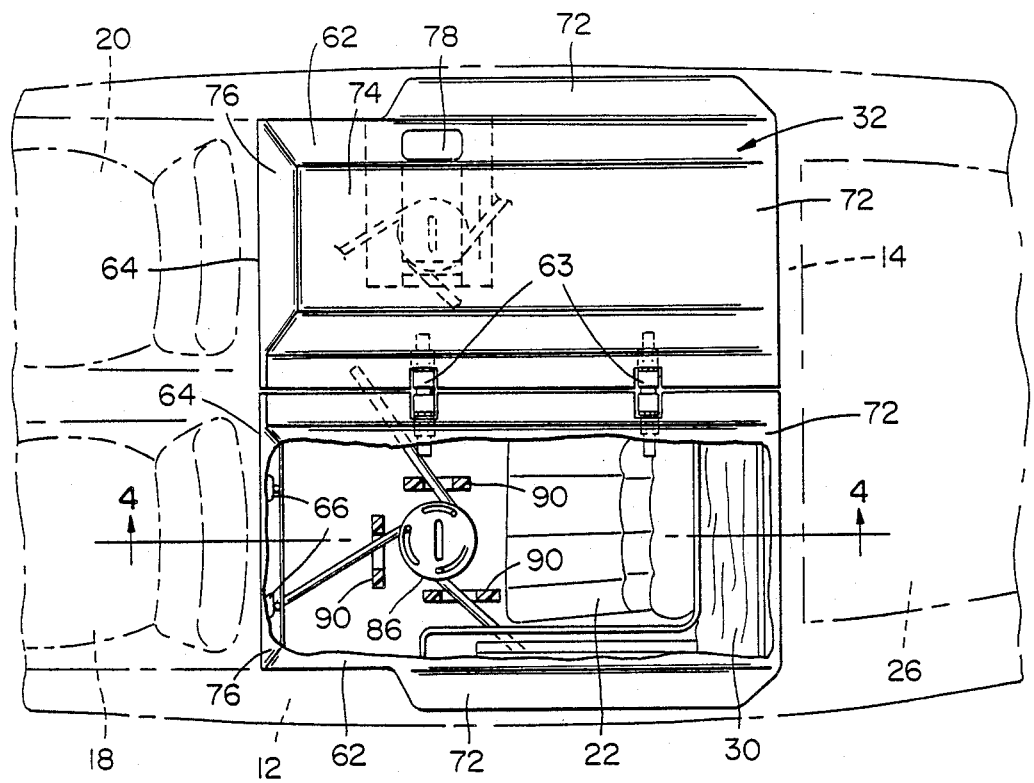
FIG. 3 is a top plan view of the cover with portions of the left half of the cover broken away and illustrated in horizontal section.
Figure 4:
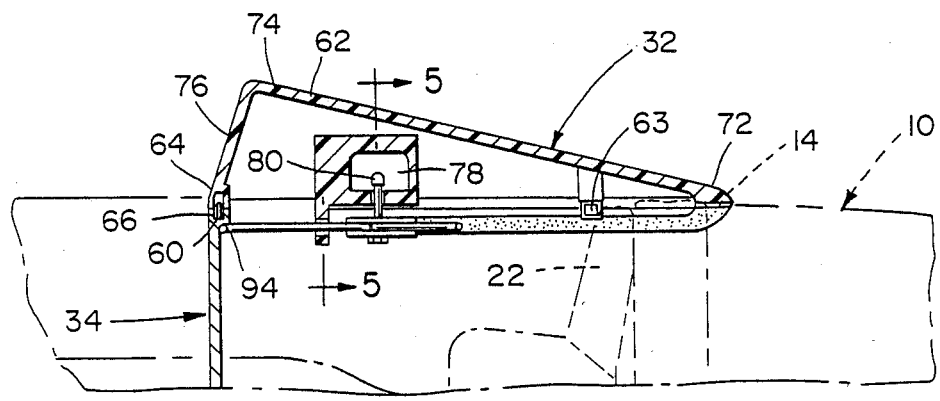
FIG. 4 is a longitudinal vertical sectional view taken substantially upon the plane indicated by the section line 4—4 of FIG. 3.
Figure 9:
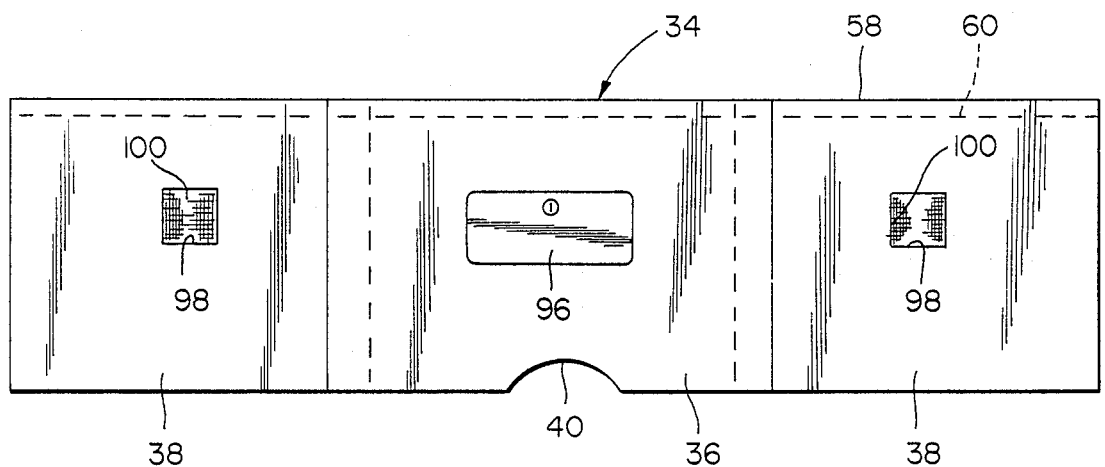
FIG. 9 is an enlarged front elevational view of a partition wall structure used in conjunction with the cove.

After the partition assembly 34 has been installed in the vehicle 10, the cover assembly 32 may be installed. The cover assembly 32 includes a pair of elongated front-to-rear extending opposite side cover sections 62 and adjacent longitudinal marginal edges of the cover sections 62 are joined through the utilization of front and rear articulated sliding hinge assemblies 63 which enable the cover sections 62 to be laterally shifted apart from the operative positions thereof illustrated in FIG. 3 and one of the sections 62 to be pivoted toward the phantom line position 62' illustrated in FIG. 2 or the alternate phantom line position 62" illustrated in FIG. 2. The forward marginal edges 64 of the cover sections 62 each include a pair of downwardly projecting rollers 66 supported therefrom and the rollers 66 are rollingly received in the channel 60. The position 62' of the right hand cover section 62 illustrated in FIG. 2 is the position of that cover initially assumed when both cover sections 62 are to be removed from the vehicle 10 and the position 62' illustrated in FIG. 2 is that position of the cover section 62 on the right end of FIG. 2 which is assumed when access is to be gained to the body interior portion 16 rearward of the transverse partition assembly 34.

The sliding hinge assemblies 63 are more clearly illustrated in FIGS. 7 and 8, in effect, function in generally the same manner as the hinge assemblies 42 to allow swinging of the cover sections 62 to the positions 62' and 62" as well as the relative positions of the cover 62 illustrated in FIG. 15 wherein they are foldably collapsed and may be inserted into and enclosed within a storage bag 70.

Each of the cover sections 62 includes an outer side outwardly projecting and downwardly curving flange portion 72 for overlying the upper margin 24 of the corresponding body side wall portion 12. In addition, the rear margins 72 overlie and are supported from the transverse surface portion 14.

With attention now invited more specifically to FIG. 5 of the drawings, it may be seen that each cover section 62 defines an upward projection 74 extending substantially the full length of the cover section 62 and tapering in height from the front end thereof to the rear margin 72.

The forward ends of the projections 74 define slightly rearwardly and upwardly inclined front walls 76 and the front walls 76 may have resilient pads (not shown) supported therefrom to act as headrests for persons disposed in the seats 18 and 20.

With attention now invited more specifically to FIG. 5, each cover section 62 defines a laterally outwardly opening recess 78 in which a latch handle 80 is rotatably mounted and each latch handle 80 is mounted upon a rotatably supported latch shaft on the upper end thereof. Each latch shaft is journalled from the corresponding cover section 62 and supports an operating disk 86 on the lower end thereof, each operating disk having three latch arms 88 pivotally supported therefrom at one pair of corresponding ends of the latch arms. The longitudinal mid-portion of each latch arm 88 is slidably received through a guide 90 carried by the corresponding cover section 62 and two latch arms 88 of each set thereof includes an adjustable length outer end member 92 threadedly mounted thereon. The latch arms 88 not provided with end members 92 are received through guides (not shown) similar to the guides 90 and carried by the other cover section and the forwardmost latch arm provided with an outer end member 92 is receivable beneath a downwardly facing ledge 94 defined by the corresponding section 38 of the transverse partition assembly 34 the remaining end member equipped latch arm is receivable in a socket (not shown) provided therefor in the inner surface of the corresponding body side wall portion 12. Accordingly, the latch handle 80 may be rotated to retract and extend the outer ends of the latch arms 88 and to thereby lock the cover sections 62 against relative swinging and in position over the rear portion of the body interior portion 16 disposed rearward of the seats 18 and 20.

Further, if it is desired, the handles 80 may be removably supported from the shafts 82 to thereby enable the handles 80 to be removed in order to prevent unauthorized opening of the cover sections 62.

The center section 36 includes a hinged and lockable glove box cover 96 supported therefrom and the rear side of the center section 36 may have a forwardly opening glove box or receptacle (not shown) supported therefrom in alignment with the glove box door 96. Otherwise, the glove box door 96 may merely removably close an access opening 98 disposed therebehind in order to provide ready access to that portion of the body interior portion 16 disposed beneath the cover assembly 32. Also, each of the sections 38 defines an opening 98 therethrough and includes a mesh cover 100 over the front side of the corresponding opening 98. These openings 98 may have radio speakers secured therebehind, if desired.

The cover assembly 32 and transverse partition assembly 34 may be constructed of any suitable material including plastic or fiberglass. Further, in convertible vehicles not including rear seats, the transverse partition assembly 34 may be used alone in order to close access openings which communicate the interior of the rear trunk areas of some convertibles with the body interior portion rearward of the driver's seat.

When the transverse partition assembly 34 and cover assembly 32 are in operative positions in and on the vehicle 10, air moving relatively rearwardly over the top margin of the windshield assembly 28 and outward of the opposite side margins thereof cannot swirl within the body interior portion 16 rearward of the transverse partition assembly 34 and the projections 74 of the cover assembly 32 tend to act as vanes to smooth out such rearward air flow over the cover assembly 32. This substantially reduces wind noise and substantially eliminates swirling air eddy currents about the heads of persons seated in the seats 18 and 20. Furthermore, when provided with resilient pads, the front walls 76 define headrests for the persons seated in the seats 18 and 20.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination, a vehicle of the type defining an upwardly opening interior portion between laterally spaced front-to-rear extending body side wall portions and forward of a rear upwardly facing transverse surface portion of said vehicle extending between rear portions of said body side wall portions, a transverse wall extending between said body side wall portions forward of said rear transverse surface portion and including an upper surface portion, a driver's seat for said vehicle disposed closely forward of said transverse wall, said transverse wall and side wall portions, rearward of said transverse wall, including upwardly facing surface portions generally horizontally registered with said transverse surface portion, a removable cover assembly for said interior portion, said cover assembly including front and rear transverse margins and opposite side margins extending between said front and rear margins and being removably positioned over said interior portion rearward of said driver's seat with said front and rear margins supported from said transverse wall upper surface portion and said upwardly facing surface portion, respectively, and said side margins supported from said body side wall upwardly facing surface portions, said cover assembly and vehicle including coacting means releasably securing said cover assembly to said body, said cover assembly including a raised forward portion in front-to-rear alignment with and disposed closely rearward of said driver's seat for disposition closely behind the head of a driver disposed in said driver's seat.

2. The combination of claim 1 wherein said interior portion comprises the interior area of a convertible-type passenger vehicle behind the front seats thereof.

3. The combination of claim 2 wherein said interior portion includes rear seat structure therein spaced behind said transverse wall and forward of said rear upwardly facing transverse surface portion and said rear upwardly facing transverse surface portion comprises the rear transverse body portion of said vehicle rearward of said rear seat structure.

4. The combination of claim 3 wherein said transverse wall comprises partition structure removably positioned and secured within said vehicle interior portion between said body side wall portions rearward of said driver's seat.

5. The combination of claim 4 wherein said partition structure includes pivotally interconnected and generally coplanar center and opposite side sections relatively foldable into a compact storage state with said sections disposed in superposed relation.

6. The combination of claim 5 wherein said partition structure includes front and rear sides and latch means on said rear side for releasably latching said partition structure sections in coplanar relation.

7. The combination of claim 6 wherein said partition structure includes hinge means pivotally supporting said sections for swinging between said coplanar and superposed positions, said hinge means being disposed entirely on the rear side of said partition structure.

8. The combination of claim 7 wherein said partition structure includes latch means cooperable with said body side wall portions to releasably lock said partition structure in said vehicle, said latch means being disposed on the rear side of said partition structure.

9. The combination of claim 8 wherein said cover assembly includes latch structure cooperable with said body side wall portions and said partition structure releasably latching said cover assembly to said vehicle.

10. In combination, a convertible-type vehicle including an upwardly opening interior portion defined between laterally spaced front-to-rear extending body side wall portions, a rearwardly upwardly facing transverse surface portion of said vehicle extending between rear portions of said body side wall portions, front seat structure disposed in said interior portion disposed between forward portions of said vehicle body side wall portions, said side wall portions, rearward of said front seat structure including upper surface portions generally horizontally registered with the first mentioned surface portion, an upstanding transverse wall extending between said side wall portions closely rearward of said front seat structure and including an upper margin generally horizontally registered with said upper surface portions and said first mentioned surface, a cover assembly including front and rear margins and opposite side margins extending between said front and rear margins, said cover assembly being disposed over said interior portion rearward of said transverse wall with said forward margin supported from said transverse wall upper margin, said opposite side margins supported from said upper said upper surface portions and said rear margin supported from said first mentioned surface portion.

11. The combination of claim 10 wherein said front seat structure defines a driver's position and a passenger's position, said cover assembly including a pair of front-to-rear extending upward projections disposed in front-to-rear alignment with said driver and passenger positions, said projections including upstanding forward surface portions disposed for disposition immediately behind a driver and passenger disposed on said front seat structure.

12. The combination of claim 11 wherein said projections extend a major portion of the front-to-rear length of said cover assembly and taper rearwardly in height.

13. The combination of claim 10 wherein said upstanding transverse wall and vehicle include coacting structure releasably securing said transverse wall in said vehicle.

14. The combination of claim 10 wherein said cover assembly and vehicle include coacting structure releasably securing said cover assembly in position on said vehicle.

15. The combination of claim 14 wherein said upstanding transverse wall and vehicle include coacting structure releasably securing said transverse wall in said vehicle.

* * * * *